May 23, 1961 J. S. HOLLINGS 2,985,576
FUEL ELEMENT FOR NUCLEAR REACTOR
Filed Nov. 26, 1956
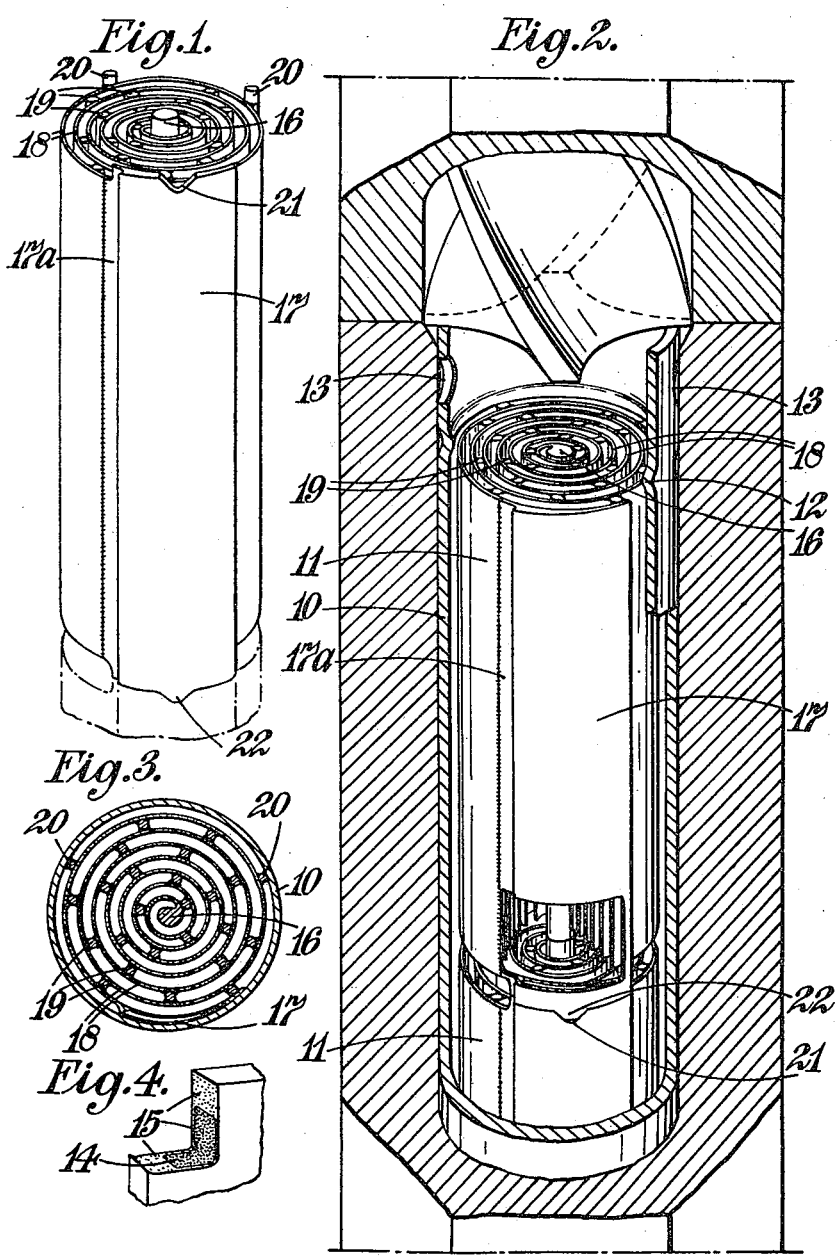

United States Patent Office 2,985,576
Patented May 23, 1961

2,985,576

FUEL ELEMENT FOR NUCLEAR REACTOR

John Shaw Hollings, Derby, England, assignor to Rolls-Royce Limited, Derby, England, a British company Filed Nov. 26, 1956, Ser. No. 624,289

Claims priority, application Great Britain Dec. 8, 1955

4 Claims. (Cl. 204—193.2)

This invention comprises improvements in or relating to nuclear reactors and has for an object to provide an improved fuel element for such reactors.

According to the present invention, a fuel element for a nuclear reactor comprises a thin sheet formed from clad uranium and arranged in a plurality of layers which are held in spaced relation to afford therebetween flow paths for the cooling fluid of the reactor, the spacing of the layers being such as to obtain good heat transfer between the fuel and the cooling fluid. The uranium may be clad for example in aluminium, steel, zirconium, niobium or beryllium.

Such a fuel element may be employed with especial advantage in a gas-cooled, say helium-cooled, reactor.

According to a preferred feature of this invention, the fuel element is formed by winding the sheet into a spiral whereof the convolutions or layers are held in spaced relation by rods inserted substantially axially between the convolutions whereby cooling fluid flow paths are formed which extend axially of the fuel element.

According to another feature of this invention, there is provided a fuel unit comprising a tubular casing and a plurality of such fuel elements arranged end to end within the tubular casing which is adapted for insertion in and withdrawal from the reactor core. Preferably in such an arrangement the fuel elements are provided with axial projections to abut adjacent fuel elements to hold the ends of the sheet or sheets forming them in axially-spaced relation. Also the outer layer or layers of the fuel elements are held in spaced relation to the wall of the tubular casing to permit the cooling fluid to flow around the outside of the elements as well as between the layers thereof.

One embodiment of the invention will now be described in detail with reference to the accompanying drawings in which:

Figure 1 shows a fuel element,
Figure 2 shows a fuel unit in position in a reactor,
Figure 3 is a section through the fuel element, and
Figure 4 is a detail.

The invention in this instance is applied to fuel elements for graphite-moderated helium-cooled reactors.

The reactor may for instance comprise a core of graphite with a large number of fuel-unit-receiving parallel bores running through it, the bores being arranged in a triangular lattice pattern. The bores at one end of the core open into a cooling gas supply chamber and at the opposite end of the core into a gas outlet chamber. The reactor also includes a graphite reflector around the core and control elements arranged for adjustment in the reflector to control the operation of the reactor.

Each bore is of such length as to accommodate a fuel unit between spiral graphite elements disposed at each end of the bore, the spiral graphite elements which in effect form part of the reflector, preventing neutron streaming, whilst at the same time permitting passage of the cooling gas.

A fuel unit (Figure 2) comprises an open-ended cylindrical metal tube 10 housing a plurality of fuel elements 11, say eight elements, arranged end to end. The tube 10 has a length somewhat greater than the total length of the fuel elements 11 and is indented circumferentially adjacent each end to provide internal ribs 12 for retaining the fuel elements 11 in position. The portions of the tube 10 beyond the ribs 12 are provided with holes 13 to be engaged by the manipulating means by which the fuel unit is handled.

The fuel elements are formed from sheet metal (Figure 4) which comprises a core 14 formed by a sheet of enriched uranium, and a coating 15 of aluminium, steel, beryllium, niobium, or zirconium alloy or the like on each surface and around the edges of the uranium sheet. The coating 15 prevents fission products entering the cooling gas. The sheet may for instance be 0.022 inch thick including the coating which may be 0.003 inch thick.

The sheet has a rod 16 of inert material brazed to it along one edge, and to its opposite edge there is brazed the edge of a flange 17a projecting from the thicker part of a thin wedge-section plate 17 of inert material, the flange being in effect a continuation of one surface of the wedge section.

The sheet is wound into a spiral form (Figures 1 and 2) using the rod 16 as a core and so that the wedge-section plate 17 provides a portion at a greater radius than of the outer surface of the last of the convolutions or layers 18 of the spiral, and spacer rods 19 of inert material are brazed in position between the convolutions or layers 18 to maintain them in spaced relation, say with a spacing of about 1/16 inch. Also a number of rods 20 are brazed to the external surface of the outermost convolution or layer. The rods 16, 19, 20 extend parallel to the axis of the spiral coil. The arrangement is such that the space for cooling gas adjacent the whole of the uranium core of the sheet is of substantially uniform width.

The core rod 16, the rods 20 on the external surface of the outermost convolution and the wedge-section piece 17 project beyond each end of the coil, and the wedge-section piece 17 has a notch 21 at one end and a tongue 22 at the other. All the fuel elements 11 are arranged to occupy the same angular position in the tube 10, the tongue 22 on a fuel element engaging the notch 21 in the next fuel element, and also the coils of the fuel elements 11 are maintained in axialy-spaced relation in the tube by abutment of the projecting parts of the rods 16, 20 and wedge-section pieces 17.

In use, the cooling gas flows axially through the fuel unit passing through the spaces between the convolutions or layers 18 of the fuel elements 11 and also through the spaces between the extrenal surfaces of the fuel elements 11 and the internal surface of the tube 10, thus securing good heat transfer from the fuel elements 11 to the cooling gas.

Fuel elements in accordance with the invention are comparatively simple to manufacture, and have a large surface area in contact with the heat transfer medium in relation to their weight.

Moreover, since the heat is actually produced in the thin spiral sheet, the efficiency of heat transfer from the fuel to the cooling medium is high.

I claim:

1. A fuel element for a nuclear reactor comprising a sheet of clad uranium of spiral form, the spiral having several convolutions, one edge of the sheet being at the center of the spiral and the opposite edge of the sheet being in the external surface of the spiral, a core rod rigidly secured to said one edge of the sheet and extending parallel to the axis of the spiral, a plurality of axially-extending spacer rods rigidly secured to the sheet between the convolutions of the spiral thereby to hold the convolutions in spaced relation, whereby cooling fluid of the reactor can flow between the convolutions of the spiral, a plurality of circumferentially-spaced rods extending axially of the spiral and secured to the external surface of the outermost convolution of the spiral, said core rod and said circumferentially-spaced rods projecting axially beyond the ends of the spiral sheet, and a wedge section piece secured to said opposite edge of the sheet and affording the circumferential continuation of the outermost convolution of the spiral, said wedge section piece extending at its ends axially beyond the ends of the spiral sheet, one end of the wedge piece having a notch therein and the opposite end having thereon an axially-projecting tongue.

2. A fuel unit for a nuclear reactor comprising a tubular casing and a plurality of fuel elements accommodated within the tubular casing in end to end relationship, each of said fuel elements comprising a sheet of clad uranium of spiral form, the spiral having several convolutions, one edge of the sheet being at the center of the spiral and the opposite edge of the sheet being in the external surface of the spiral, a core rod rigidly secured to said one edge of the sheet and extending parallel to the axis of the spiral, a plurality of axially-extending spacer rods rigidly secured to the sheet between the convolutions of the spiral thereby to hold the convolutions in spaced relation, whereby cooling fluid of the reactor can flow between the convolutions of the spiral, a plurality of circumferentially-spaced rods extending axially of the spiral and secured to the external surface of the outermost convolution of the spiral, said core rod and said circumferentially-spaced rods projecting axially beyond the ends of the spiral sheet, and a wedge section piece secured to said opposite edge of the sheet and affording a circumferential continuation of the outermost convolution of the spiral, said wedge section piece extending at its ends axially beyond the ends of the spiral sheet, one end of the wedge piece having a notch therein and the opposite end having thereon an axially-projecting tongue, the ends of the core rod and circumferentially-spaced rods of each fuel element abutting the corresponding rods of adjacent fuel elements to hold the fuel elements in axially-spaced relation, and the tongue on the wedge piece of each fuel element engaging the notch in the wedge piece of an adjacent fuel element to hold the fuel elements angularly with respect to one another.

3. A fuel element for a nuclear reactor comprising a sheet of clad uranium in spiral form, one edge of the sheet being at the center of the spiral and the spiral having several convolutions successively one outside the other, said convolutions being radially spaced apart, and spacer members extending axially of the spiral, disposed between the convolutions and secured to the sheet to hold the convolutions in radially spaced relation, said convolutions and spacer means defining axially-extending flow paths between the convolutions.

4. A fuel unit for a nuclear reactor comprising a tubular casing and a plurality of fuel elements accommodated within the tubular casing in end-to-end relationship, each of said fuel elements comprising a sheet of clad uranium in spiral form one edge of the sheet being at the center of the spiral and the spiral having several convolutions successively one outside the other, said convolutions being radially spaced apart, and spacer members extending axially of the spiral, disposed between the convolutions, and secured to the sheet to hold the convolutions in radially spaced relation, said convolutions and spacer means defining axially-extending flow paths between the convolutions, further spacer members secured to the outermost convolution of the spiral and holding the outermost convolution in radially spaced relation to the tubular casing, and axially abutting parts projecting axially from the fuel elements and interabutting to hold the fuel elements in axially-spaced relation.

References Cited in the file of this patent
UNITED STATES PATENTS

| | | |
|---|---|---|
| 813,918 | Schmitz | Feb. 27, 1906 |
| 2,780,596 | Anderson | Feb. 5, 1957 |
| 2,813,073 | Saller et al. | Nov. 12, 1957 |
| 2,831,806 | Wigner | Apr. 22, 1958 |
| 2,832,732 | Wigner | Apr. 29, 1958 |
| 2,879,216 | Hurwitz et al. | Mar. 24, 1959 |

FOREIGN PATENTS

| | | |
|---|---|---|
| 999,330 | France | July 16, 1952 |

OTHER REFERENCES

Atomic Industry Reporter, News and Analysis, Number 9, Aug. 3, 1955, Sec. 1–59.

Cunningham et al.: p/953, Proceedings of the Inernational Conference on the Peaceful Uses of Atomic Energy, August 1955, vol. 9, pub. (1956) by United Nations, N.Y., pages 203–207.